United States Patent
Rottenberg et al.

(10) Patent No.: US 8,067,810 B2
(45) Date of Patent: Nov. 29, 2011

(54) SELF-ACTUATING RF MEMS DEVICE BY RF POWER ACTUATION

(75) Inventors: Xavier Rottenberg, Schaarbeek (BE); Stefan Pauwen, Bilzen (BE)

(73) Assignee: IMEC, Leuven (BE)

( * ) Notice: Subject to any disclaimer, the term of this patent is extended or adjusted under 35 U.S.C. 154(b) by 420 days.

(21) Appl. No.: 12/413,432

(22) Filed: Mar. 27, 2009

(65) Prior Publication Data

US 2009/0262043 A1    Oct. 22, 2009

Related U.S. Application Data

(60) Provisional application No. 61/040,200, filed on Mar. 28, 2008.

(51) Int. Cl.
*H01L 29/82* (2006.01)

(52) U.S. Cl. ........ 257/414; 257/415; 257/421; 333/105; 333/262; 343/876

(58) Field of Classification Search ............. 343/876, 343/904; 310/300, 309; 333/32, 105, 262; 257/414–418, 421; 361/139, 150, 152, 154, 361/160, 233
See application file for complete search history.

(56) References Cited

U.S. PATENT DOCUMENTS

| | | | | |
|---|---|---|---|---|
| 6,734,512 | B2 * | 5/2004 | Suzuki | 257/414 |
| 6,897,537 | B2 * | 5/2005 | de los Santos | 257/414 |
| 7,042,308 | B2 * | 5/2006 | Chou | 333/105 |
| 7,439,117 | B2 * | 10/2008 | Tilmans et al. | 438/197 |
| 7,692,519 | B2 * | 4/2010 | Premerlani et al. | 333/262 |

* cited by examiner

*Primary Examiner* — Hoang V Nguyen
(74) *Attorney, Agent, or Firm* — McDonnell Boehnen Hulbert & Berghoff LLP

(57) ABSTRACT

Systems and methods for controlling a micro electromechanical device using power actuation are disclosed. The disclosed micro electromechanical systems comprise at least one electrostatically actuatable micro electromechanical device and an actuation device. The micro electromechanical device comprises a first conductor and a second conductor having a moveable portion which in use may be attracted by the first conductor as a result of a predetermined actuation power. The actuation device comprises a high frequency signal generator for generating at least part of the actuation power by means of a predetermined high frequency signal with a frequency higher than the mechanical resonance frequency of the moveable portion of the micro electromechanical device.

13 Claims, 11 Drawing Sheets

SELF-ACTUATING RF MEMS DEVICE BY RF POWER ACTUATION

PRIORITY CLAIM

The present application claims priority to U.S. provisional application 61/040,200 filed on Mar. 28, 2008, the entirety of which is hereby incorporated by reference.

FIELD

The present disclosure relates to Micro Electromechanical devices, methods for actuating Micro Electromechanical devices, and systems comprising Micro Electromechanical devices that practice the disclosed methods.

BACKGROUND

Micro Electromechanical devices (MEMS) are devices with moveable portions such as switches that can be electrostatically or piezoelectrically actuated. In the case of an electrostatically actuated MEMS device, an electrostatic force is induced by applying a voltage between the actuation-electrode and a movable bridge (thereby moving the bridge). One type of MEMS device is an RF switch. One drawback of RF switches is that an RF signal may produce an electrostatic force pulling down the switch which causes it to switch at an undesired time. This condition is known as parasitic self-actuation. Parasitic self-actuation is undesirable in many applications. Earlier efforts have focused on avoiding parasitic self-actuation. For example, U.S. Pat. No. 7,042,308 describes a MEMS switch where a resistor is coupled to an actuation electrode to avoid self-actuation when the switch is open.

SUMMARY

Systems and methods for actuating a MEMS device are disclosed. One disclosed system includes a MEMS system comprising at least one actuatable micro electromechanical device comprising a first conductor and a second conductor. The second conductor has a moveable portion which may be attracted by the first conductor as a result of a predetermined actuation power. This first disclosed system may further comprise an actuation device for generating the predetermined actuation power for the micro electromechanical device. The actuation device may comprise a high frequency signal generator configured to generate at least part of the actuation power by means of a predetermined high frequency signal with a frequency higher than the mechanical resonance frequency of the moveable portion.

In one embodiment, the high frequency signal generator may be configured to generate an RF signal.

In another embodiment, the actuation device of the micro electromechanical system may further comprise a DC voltage generator. The DC voltage generator may be configured to generate part of the actuation power by means of a predetermined DC voltage.

In yet another embodiment, one of the conductors of the MEMS device may be designed as an RF signal line configured to transport the high frequency signal while the other conductor may be connected to ground. In this embodiment, the signal is preferably an RF signal.

In another embodiment, the micro electromechanical system may further comprise a power amplifier configured to amplify the high frequency signal to a predetermined actuation power.

In a preferred embodiment, at least one micro electromechanical device is a switch. The switch may be implemented as a capacitive switch. In an alternative embodiment, the switch may be configured as an LC-tank thereby reducing the required power for actuation.

One system incorporating the disclosed RF micro electromechanical devices may comprise a receiver block and a transmitter block. The receiver block and the transmitter block may be connected to an antenna via the disclosed micro electromechanical device.

Methods for controlling the disclosed micro electromechanical devices and systems are also disclosed. A method according to one embodiment comprises the steps of generating at least part of the actuation power by means of a high frequency signal generator. The high frequency signal generated by a high frequency signal generator is preferably guided by a coplanar wave guide.

Another method for controlling a micro electromechanical system may further comprise generating at least part of the actuation power by means of a DC voltage generator.

Yet another method for controlling a micro electromechanical system may further comprise electrostatically actuating the MEMS or at least partly controlling the actuation of the MEMS via electrostatically controlled means. The MEMS may also be piezoelectrically or thermally actuated, or at least partly controlled by piezoelectric or thermal actuation means. For example, in the case of piezoelectric actuation, a piezoelectric material may be provided between the first and second conductors. In the case of thermal actuation, part of the actuation power may be provided by Joule heating. For example, the temperature of a power amplifier configured to amplify the high frequency signal to a predetermined actuation power may increase during operation, and this increase in heat may be sufficient to thermally actuate the MEMS in some embodiments.

A method for controlling a system comprising the disclosed RF micro electromechanical devices is also disclosed. The RF micro electromechanical system preferably comprises at least one micro electromechancial device such as a Single-Pole Double Throw (SPDT) switch. The system may further comprise a receiver and a transmitter block. The receiver and transmitter blocks may be connected to an antenna by means of a switch. The switch on the transmitter side may be actuated during transmission when there is a high power on the line. At the same instance, a switch is closed at the receiver side, thereby reflecting the high power signal routed to the antenna. No additional actuation mechanism is needed, or, a less complex structure can be used with a lower DC voltage.

Many researchers have considered RF self actuation to be a problem for the proper function of RF MEMS devices. Researchers have therefore consistently tried to mitigate RF self actuation through MEMS design, processing, or packaging. In the case of switching structures for example, these RF MEMS devices were implemented as relays to decouple the RF self actuation areas from the actual actuation areas and/or as switches configured either with off-centered actuation areas to lower the RF self actuation efficiency, or with pull-up electrodes.

The present disclosure describes actuatable micro electromechanical systems and methods for operating actuable micro electromechanical systems where the available power of the system can be used for actuation. For an RF MEMS system, the power of the RF signal can be used for actuation. Some embodiments may require no additional actuation mechanism. Other embodiments may only require a small additional source to provide the actuation mechanism. Furthermore, bipolar signals mitigate charging and enhance the lifetime of the MEMS system.

BRIEF DESCRIPTION OF THE DRAWINGS

The disclosed systems and methods will be further described by means of the following description and the appended figures.

DETAILED DESCRIPTION

Particular embodiments are described with reference to certain figures, but the present invention is defined by the claims and is not limited to these disclosed embodiments. The figures described are only schematic and are non-limiting. In the figures, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the disclosed embodiments may operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the disclosed embodiments may operate in other orientations than described or illustrated herein.

The term "comprising" should not be interpreted as being restricted to the means listed thereafter; it does not exclude other elements or steps. Instead, "comprising" should be interpreted as specifying the presence of the stated features, integers, steps or components as referred to, but not precluding the presence or addition of one or more other features, integers, steps or components, or groups thereof.

Figure 1:
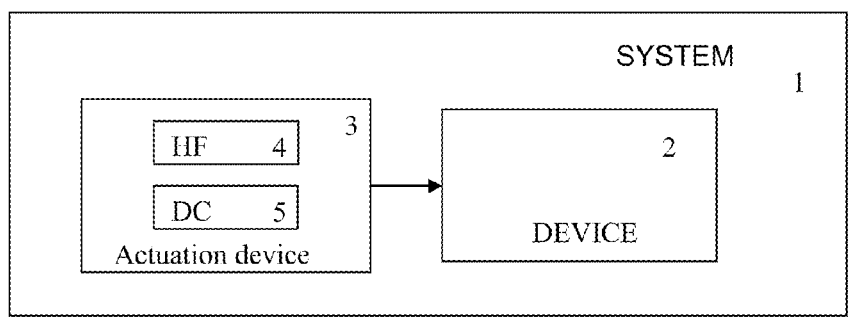
FIG. 1 shows schematically the system of one embodiment.

The present disclosure describes systems and methods for optimal use of the available power for actuating or controlling a moveable portion of a micro electromechanical (MEMS) device. One embodiment is schematically illustrated in FIG. 1. The embodiment shown in FIG. 1 comprises at least one actuatable MEMS device 2 that is part of a micro electromechancial system (MEMS) 1, which further comprises an actuation device 3. The actuatable MEMS device comprises a first conductor and a second conductor. The second conductor has a moveable portion which in use may be attracted by the first conductor as a result of a predetermined actuation power. The actuation device 3 comprises a high frequency signal generator 4 that is configured to generate at least part of the actuation power. The generated signal should have a frequency which is higher than the mechanical resonance frequency of the moveable portion. The idea is that the moveable portion can not follow the applied high frequency signal and therefore senses a constant force, equivalent to an electrostatic force (normally used to actuate the MEMS device). The generated high frequency signal may be an RF signal guided by one of the conductors, while the other conductor is connected to ground. The actuation device 3 may further comprise a DC voltage generator 5 configured to generate a part of the actuation power. FIG. 1 shows an RF power system having two MEMS devices, but other configurations employing the disclosed systems and methods are envisioned.

In some telecommunications systems, a receiver and a transmitter use the same medium for data transfer when only one antenna is provided for sending and receiving. The final stage of the transmitter is usually a power amplifier (PA) while the first stage on the receiver side is typically a low noise amplifier (LNA). The power amplifier and the low noise amplifier should be separated from each other to optimally use power, and to avoid damaging the sensitive input of the LNA by the high power of the power amplifier. The power amplifier can be separated from the low noise amplifier by placing a changeover switch or a single pole-double throw switch (SPDT) in between the power amplifier and the low noise amplifier. During transmission, the antenna can be connected to the output of the power amplifier through the switch, while the input of the receiver is disconnected. Disconnecting the input to the receive path from the antenna during transmission protects the LNA from the transmitted power of the power amplifier. During reception, the antenna can be connected to the input of the LNA via the switch and disconnected from the power amplifier.

In Transmit/Receive (T/R) modules like the one shown in FIG. 1, the antenna and surrounding circuitry are subjected to very different RF power levels in Transmit and Receive modes. If a T/R RF-MEMS SPDT is located before the antenna, the different power levels could cause different RF self actuation conditions for the switches. The disclosed systems and methods take advantage of this RF power actuation contrast to control the switching of the RF-MEMS SPDT based on the emitted RF power.

The high frequency signal is used as an actuation signal for the bridge; the electrostatic force $F_E$ is proportional to the square of the voltage over the switch: $F_E \propto V_C^2$. When $V_C$ is an RF signal, the electrostatic force will be rectified and a net force works on the bridge. This parasitic effect acts as an actuation signal. A switch for this application has a low and a high power state. Both switches are actuated in the high power state by the power applied at one of the gates of the SPDT. In the low power state, neither of the switches are actuated.

Figure 2:
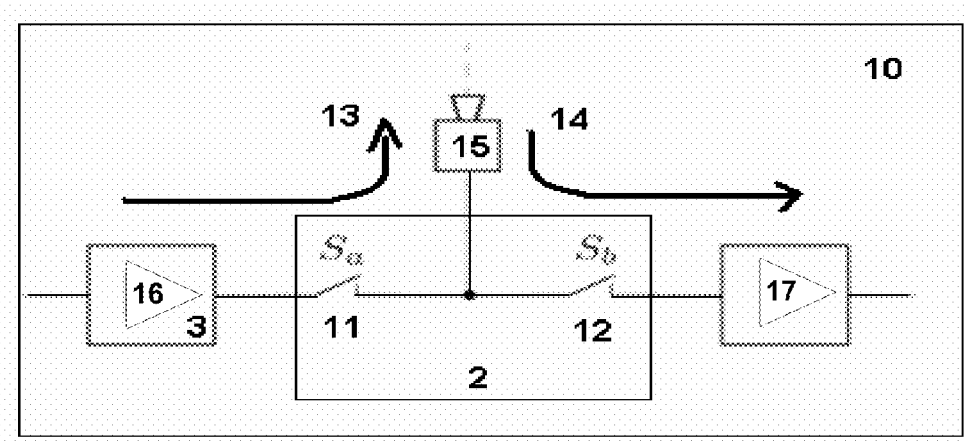
FIG. 2 shows schematically a basic two-series-switches T/R module.

FIG. 2 shows a basic Transmit/Receive SPDT switch 2 implemented in an RF front-end 10. The SPDT switch 2 comprises two series switches, $S_a$ 11 and $S_b$ 12. Switch $S_a$ 11 is placed in the transmit branch 13 of the circuit between the antenna 15 and the power amplifier (PA) 16, and switch $S_b$ 12 is placed in the receive branch 14 of the circuit between the antenna 15 and the low-noise amplifier (LNA) 17. In this configuration, only two of the four possible states of the SPDT are functional, as summarized in table 1. In the fully-closed state (when $S_a$ and $S_b$ are both closed), the PA and the LA are both connected to the antenna and to each other. In the idle-state (when $S_a$ and $S_b$ are both open), the antenna is disconnected from both the PA and the LNA. Should the switches be implemented as RF-MEMS devices, this SPDT architecture would thus not lend itself to an optimal use of the RF self actuation.

TABLE 1

| $S_a$ state | $S_b$ state | SPDT state |
|---|---|---|
| Open | Open | Non functional |
| Open | Closed | Receive |
| Closed | Open | Transmit |
| Closed | Closed | Non functional |

Figure 3:
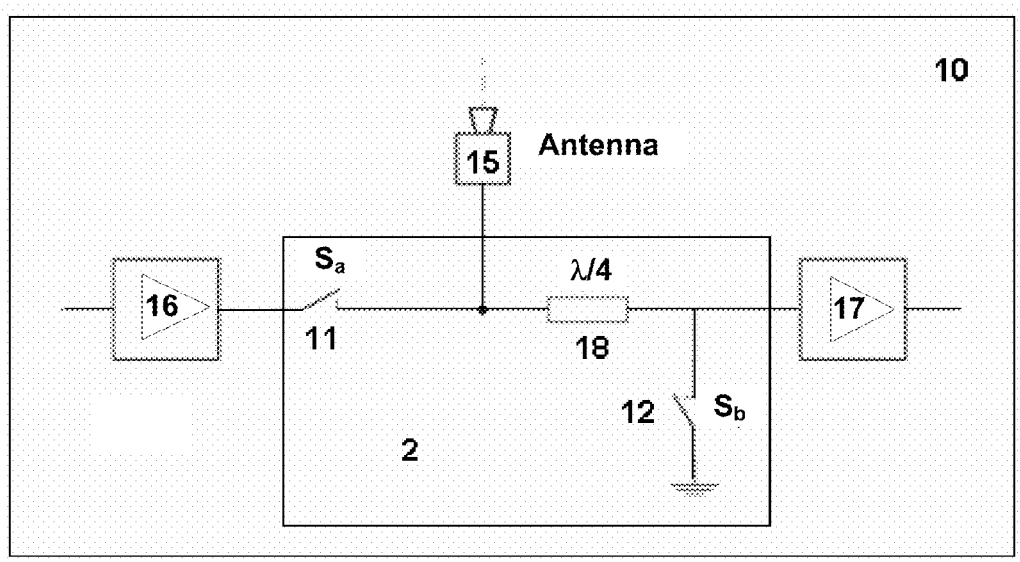
FIG. 3 shows schematically a series/shunt-switches T/R module.

For an optimal RF self actuation, and to use the RF power available from the PA 16 for the RF self actuation of the T/R SPDT 2, the idle-state should be functional. The embodiment shown in FIG. 3 is configured to use the RF power available from PA 16 for actuating T/R SPDT 2. In the configuration of FIG. 3, the second series switch 2 from FIG. 2 has been implemented by a λ/4-transformer 18 and a shunt switch 12. As shown in table 2, when switches 11 and 12 are open, the LNA 17 is connected to the antenna, and the PA 16 is isolated from the antenna 15 and the LNA 17. When switches 11 and 12 are open, the RF-short at $S_b$ 12 causes an RF-open at the antenna 15. When switches 11 and 12 are closed, the PA 16 is connected to the antenna 15, and the LNA is isolated from the antenna 15 and the PA 16.

TABLE 2

| $S_a$ state | $S_b$ state | SPDT state |
|---|---|---|
| Open | Open | Receive |
| Open | Closed | Non functional |
| Closed | Open | Non functional |
| Closed | Closed | Transmit |

Figure 4:
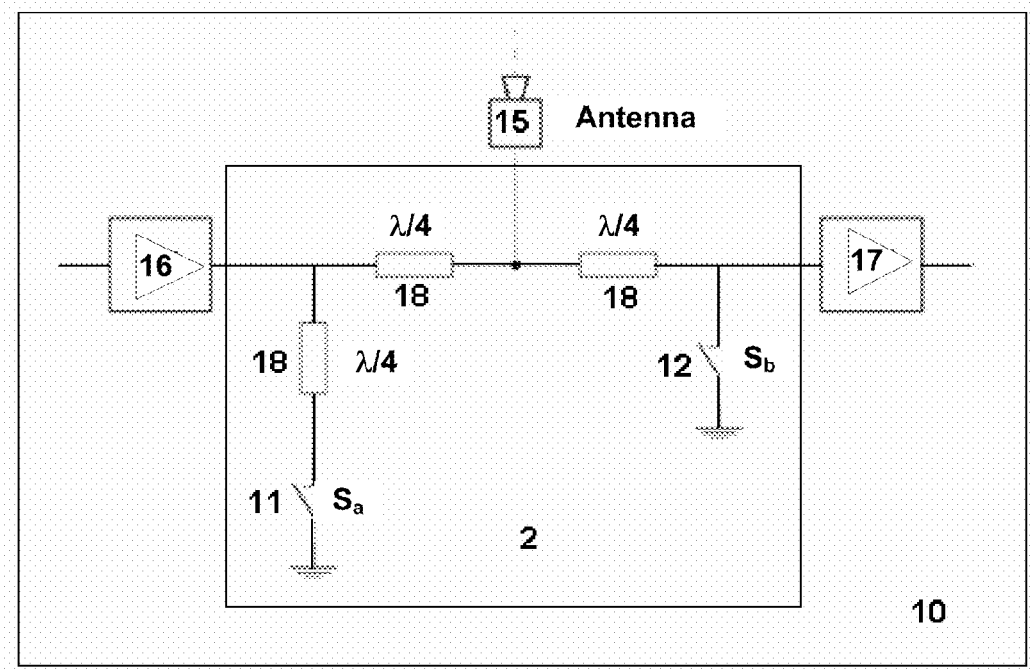
FIG. 4 shows schematically a basic two-shunt-switches T/R module.

With the addition of λ/4 sections 18, the series switch of FIG. 3 can be replaced by a shunt switch as shown in FIG. 4. The configuration shown in FIG. 4 can be implemented with only one type of switch. Further, the configuration of FIG. 4 preserves the functionality of its idle-state and thus the possibility for using the PA 16 for self actuation in the absence of DC bias.

Figure 5:
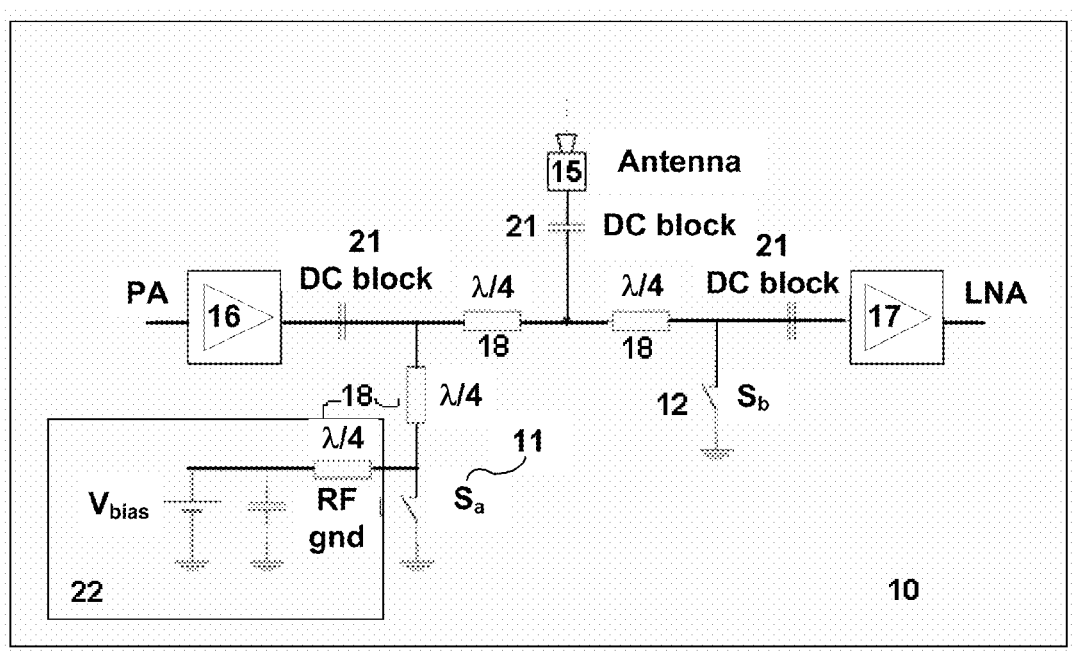
FIG. 5 shows schematically a basic two-shunt-switches T/R module configured for DC-actuation.

But if the RF power available from the PA 16 is not sufficient to actuate the SPDT 2, a DC bias could be added, as shown in FIG. 5. The configuration shown in FIG. 5 includes fixed DC block capacitors 21 and a biasing arm 22. These additional elements do not affect the RF voltage and RF current distributions in the rest of the configuration.

A simulation was performed to analyze RF self actuation for the T/R-SPDT module shown in FIG. 4. In the simulation, the PA 16 was assumed to present an internal impedance of 50Ω, and the antenna 15 and LNA 17 were assumed to offer a perfect match to 50Ω. The MEMS part of the devices 2 were simulated as ideal parallel-plate capacitors with linear springs and rigid plates. The equilibrium positions were determined in an iterative manner according to the method depicted in FIG. 6. From an initial condition at step 31 where the SPDT has initial values for the air gaps $d_{a0}$ and $d_{b0}$ (corresponding to the distance between the plates), and based on the RF models of the MEMS switches, the applied RF power $P_{avs}$ can be translated into effective DC-equivalent voltages on both MEMS capacitors, $V^*_{a0}$ and $V^*_{b0}$ at step 32. These voltages correspond to forces $f_{a0}$ and $f_{b0}$ on the respective devices that can be used to obtain new air gap values $d_{a\ new}$ and $d_{b\ new}$ 34 at steps 33 and 34. The method proceeds in an iterative manner until convergence of the algorithm at step 35. This iterative simulation technique can be used to determine the equilibrium positions for the RF self actuation.

Figure 7:
FIG. 7 shows a purely capacitive implementation of switches.
Figure 8:
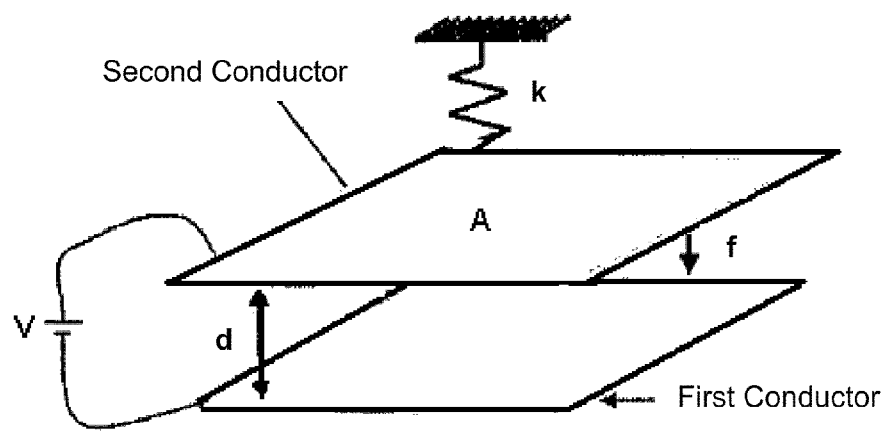
FIG. 8 shows an illustration of a capacitive switch.

Another simulation was based on the purely capacitive switch shown in FIG. 7. The purely capacitive switch of FIG. 7 represents the simplest RF model for the switch building blocks. This simulation used the following parameters: $k_{a/b}$=2 N/m (spring constant), $A_{a/b}$=7 $10^3$ μm2 (capacitor area), $d_{a/b\ 0}$=3 μm and $d_e/\epsilon_r$=0.2/25 μm (dielectric interposer thickness/relative permittivity). These parameters resulted in a pull-in voltage $V_{PI}$≈5.1 V, as illustrated in FIG. 8.

Figure 6:
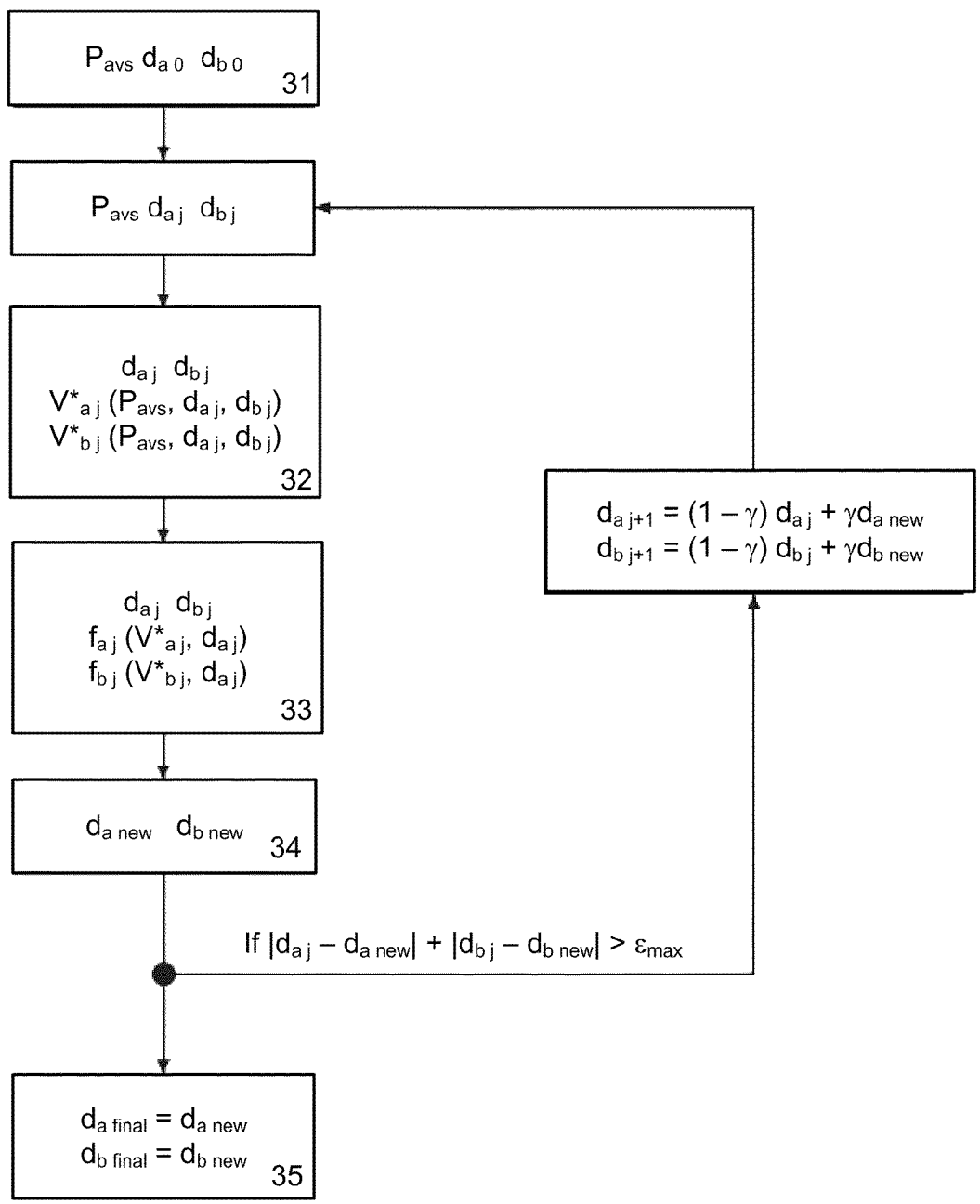
FIG. 6 shows a block diagram of a power driven iterative algorithm.
Figure 9:
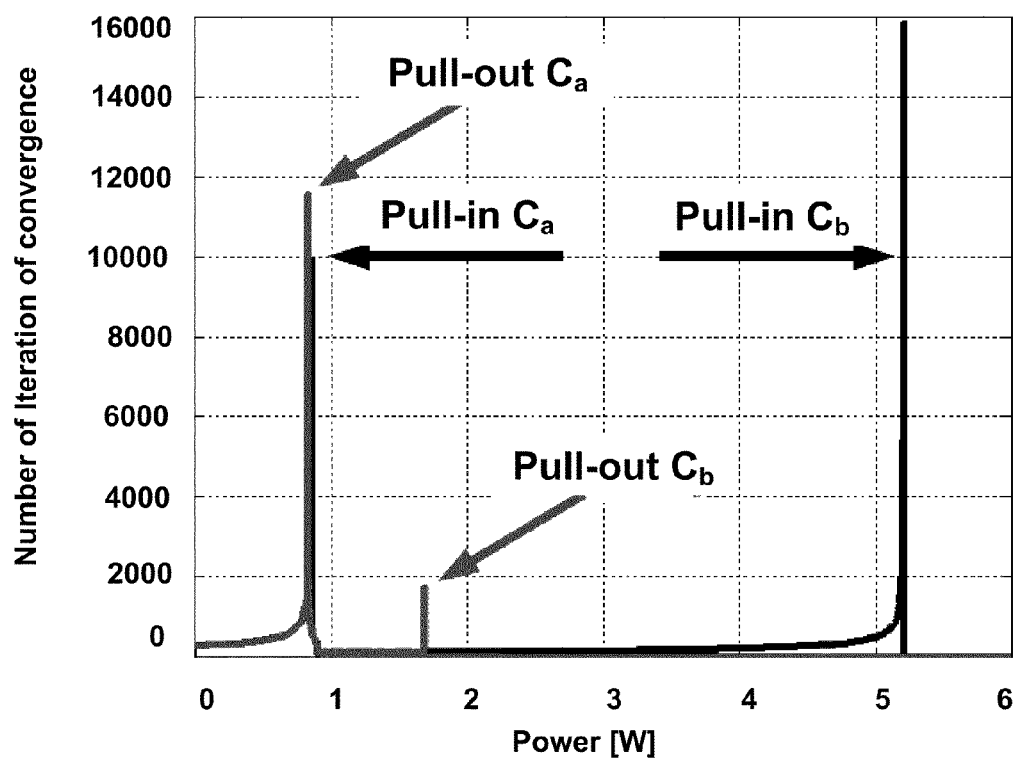
FIG. 9 plots the iteration-counts to convergence for purely capacitive switching building blocks.

FIG. 9 shows the distributions of the iteration-counts to convergence obtained by sweeping the RF power from 0 to 6 W and back by steps of 2 mW with γ=0.01 (numerical damping parameter) in FIG. 6. The pull-in and pull-out events of both $C_a$ and $C_b$ are clearly visible, and these results confirm the efficiency of the method implemented.

Figure 10:
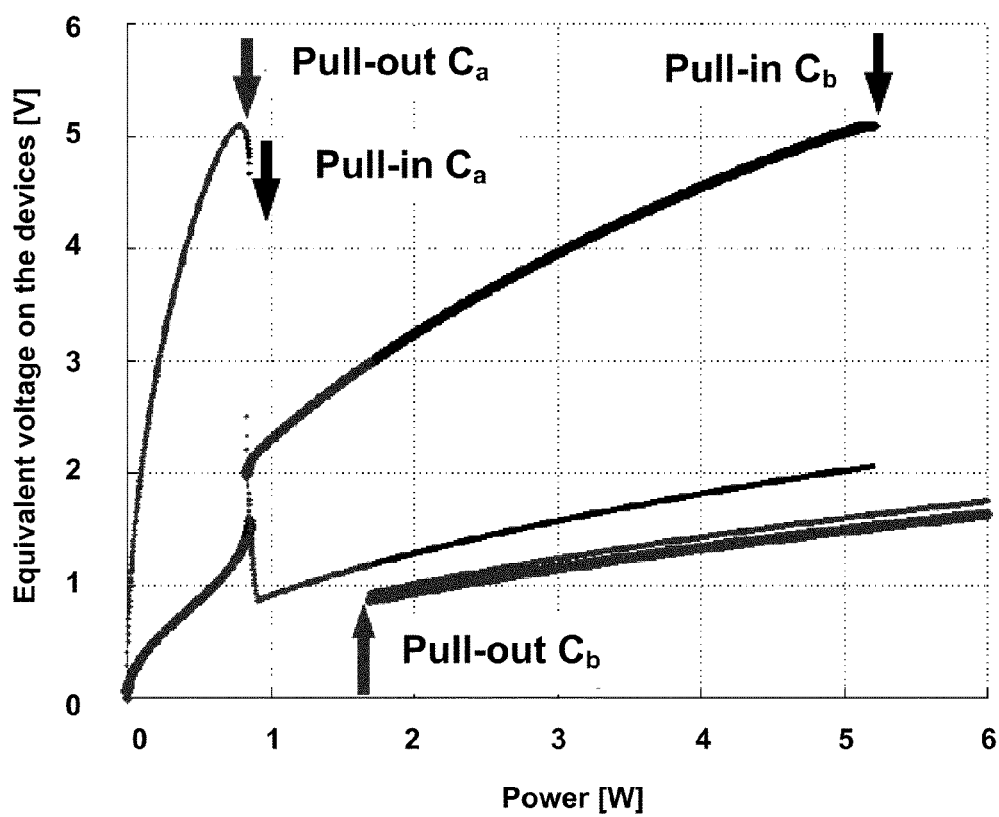
FIG. 10 plots the evolution of the pull-out and pull-in voltage in the case of purely capacitive switches.
Figure 11:
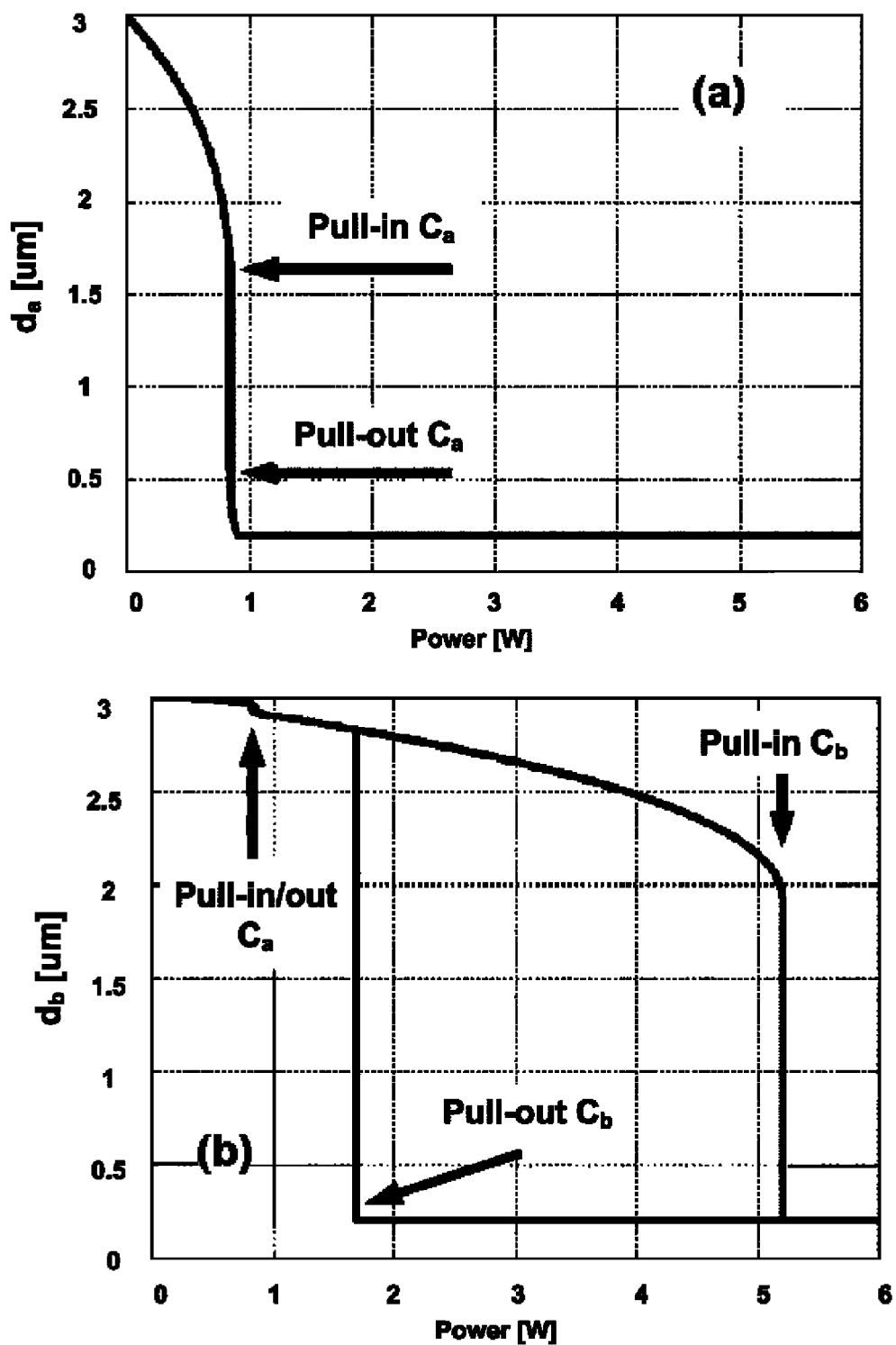
FIG. 11 plots the evolutions of the air gaps in the two purely capacitive switching building blocks.

The change in the DC-equivalent voltages on the two MEMS capacitors as a function of power is shown in FIG. 10. The maximum values reached by $V^*_{a/b}$ are approximately equal to $V_{PI\ a/b}$≈5.1 V. The $C_a$ device is closer to the PA, and thus, the applied RF power has a greater effect which causes the $C_a$ device to actuate. This RF self actuation occurs further than the DC-equivalent pull-in. Two DC-equivalent voltage jumps correspond to this pull-in event as the power is routed through the first closed switch: a drop of $V^*_a$ and an increase of $V^*_b$. Both $V^*_{a/b}$ increase while a portion of the power leaks through the antenna. The second switch closes for $P_{avs}$≈5.2 W, in a close to DC-pull-in condition. The LNA is then isolated from the PA and antenna. After pull-in of the second switch, the $V^*_{a/b}$ values increase monotonously with $P_{avs}$. When $P_{avs}$ lowers, $C_b$ and $C_a$ successively reopen. Note that $C_a$ progressively reopens before switching to its rest-state as shown by the progressive increase of $V^*_a$ near 1 W. This behavior of the SPDT setup is shown in FIG. 11 where the stable evolutions of the air gaps are depicted for the two devices separately.

Given the relatively long reaction time of RF-MEMS devices compared to the settling times of the RF-circuitry, the LNA in FIG. 4 may be subjected to relatively large power-levels during the time while the overall SPDT self-actuates. As shown in FIGS. 9-11, the RF self actuation $P_{avs}$ is approximately 5.2 W. To lower the impact of this RF power on a potentially sensitive LNA, the RF-MEMS building blocks can be designed to be more responsive to the RF self actuation. This can be done in the mechanical or electrical domains. In one example, and in a quasi-static approximation, the static pull-in voltage of the MEMS can be lowered by lowering their spring constant k or rest air gap do. As a result, the whole $P_{avs}$ scale in FIGS. 9-11 shifts downwards. In this example, the MEMS devices may have to be re-designed, and the re-designed MEMS may exhibit a higher sensitivity to vibration or shocks. In another example, the RF circuit itself can be modified to tune the response of the SPDT to the RF power available from the PA. Keeping the overall configuration the same, the MEMS switching building blocks and their close environment can be redesigned based on the LC-tanks shown in FIG. 12.

Figure 12:
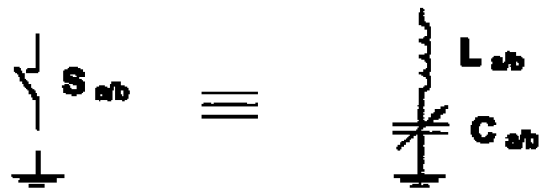
FIG. 12 shows schematically a series LC-tank implementation of switches.
Figure 13:
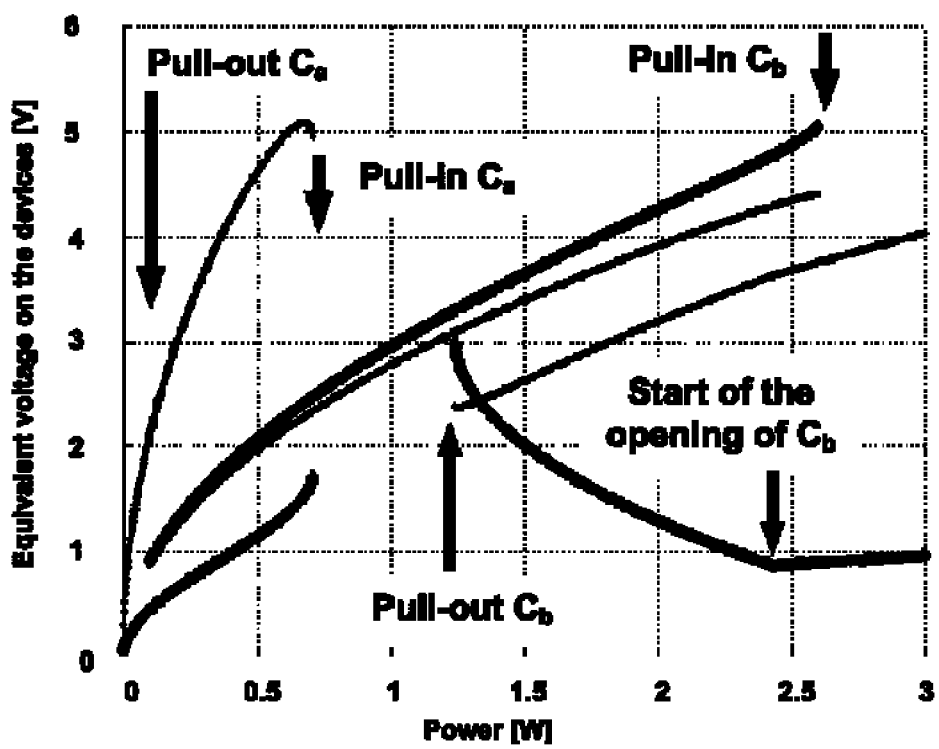
FIG. 13 plots the evolution of the pull-out and pull-in voltage in the case of capacitive switches implementing a series LC-tank.
Figure 14:
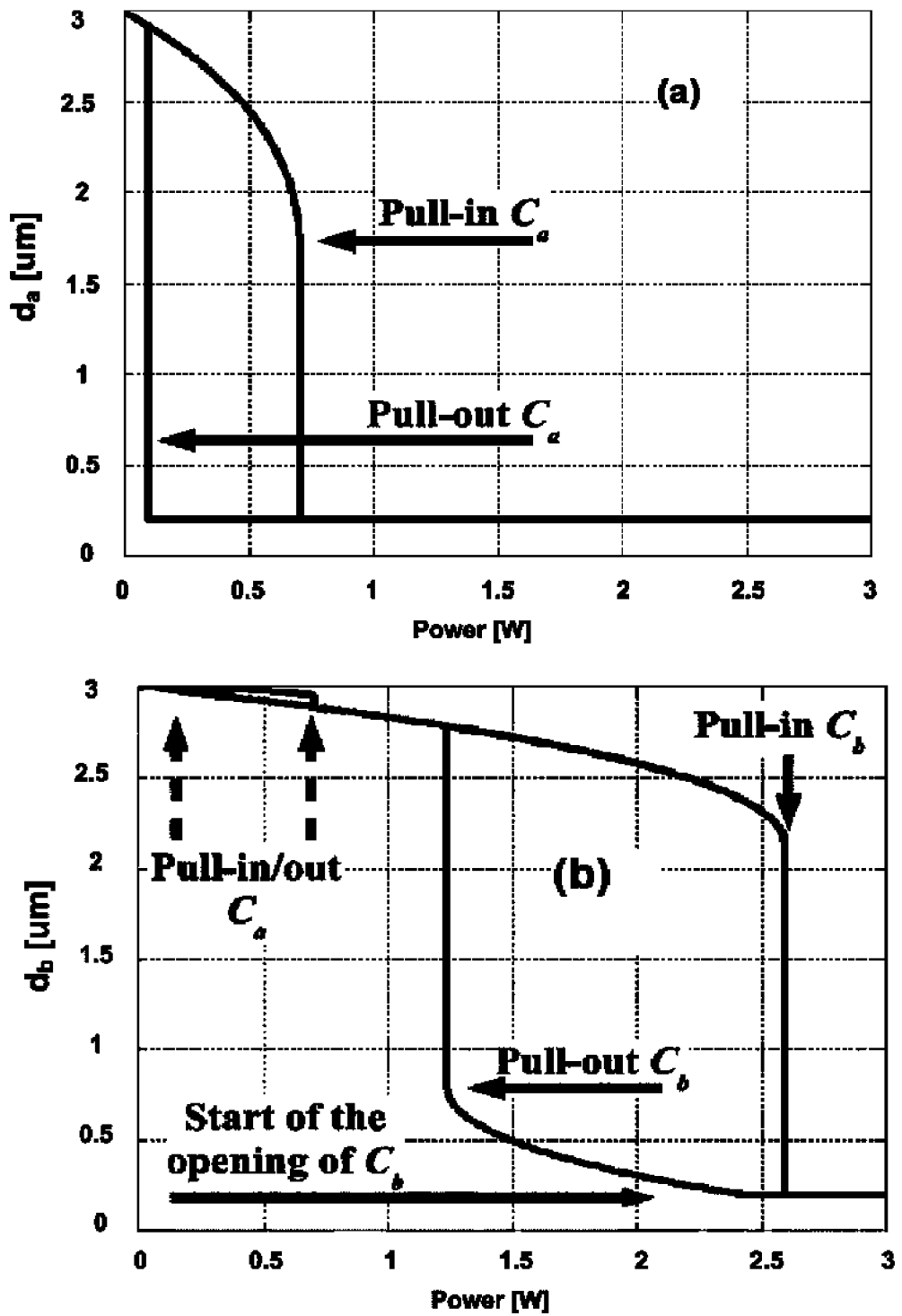
FIG. 14 plots the evolutions of the air gaps in the two LC-tank-based capacitive switching building blocks.

FIGS. 13 and 14 show the results of the RF self actuation simulation of the configuration shown in FIG. 4 with switches implemented as in FIG. 12, where $L_a$=0.2 nH, $L_b$=1 nH and all other parameters are identical to the previous purely capacitive case. The switch $S_b$ implements a large inductance to enhance its RF self actuation and so lower the required $P_{avs}$ to close the SPDT. The LC-tank resonance is very efficient as established by the drastic reduction of $P_{avs}$ for RF self actuation from 5.2 W in the purely capacitive case to 2.6 W in this resonant case. Additionally the progressive reopening of $C_b$ is reduced to 1.2 W from 2.4 W, and the RF self actuation of $C_a$ has a wide hysteresis.

Figure 15:
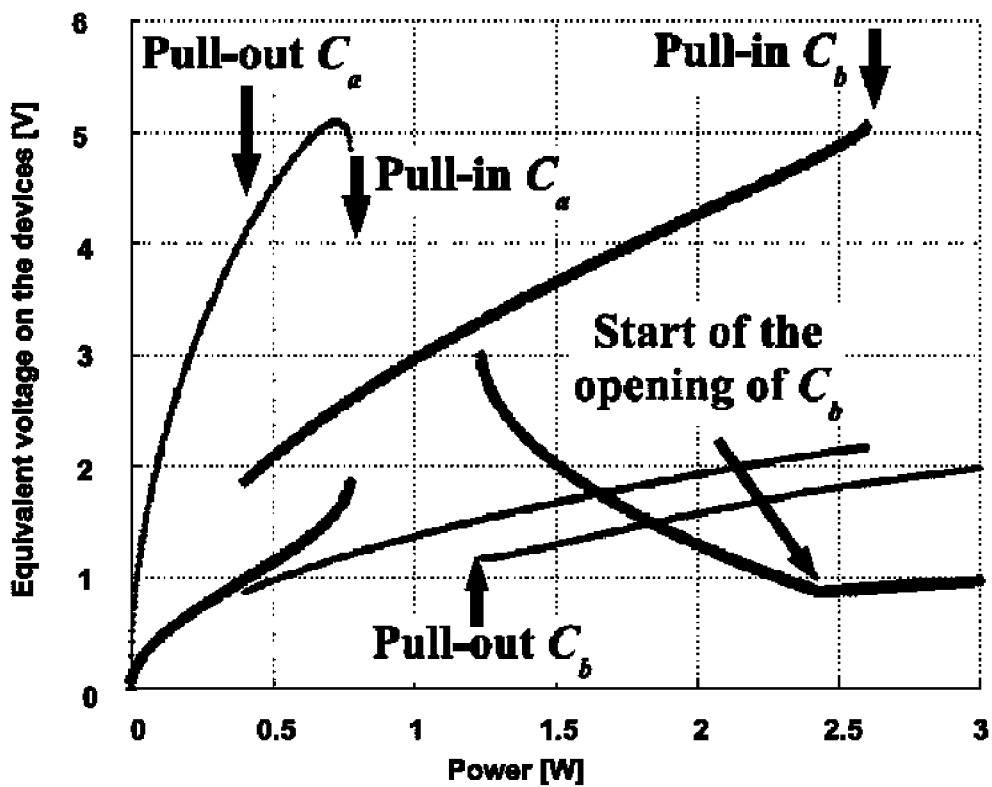
FIG. 15 plots the evolution of the pull-out and pull-in voltage in the case of capacitive switches implementing a series LC-tank.
Figure 16:
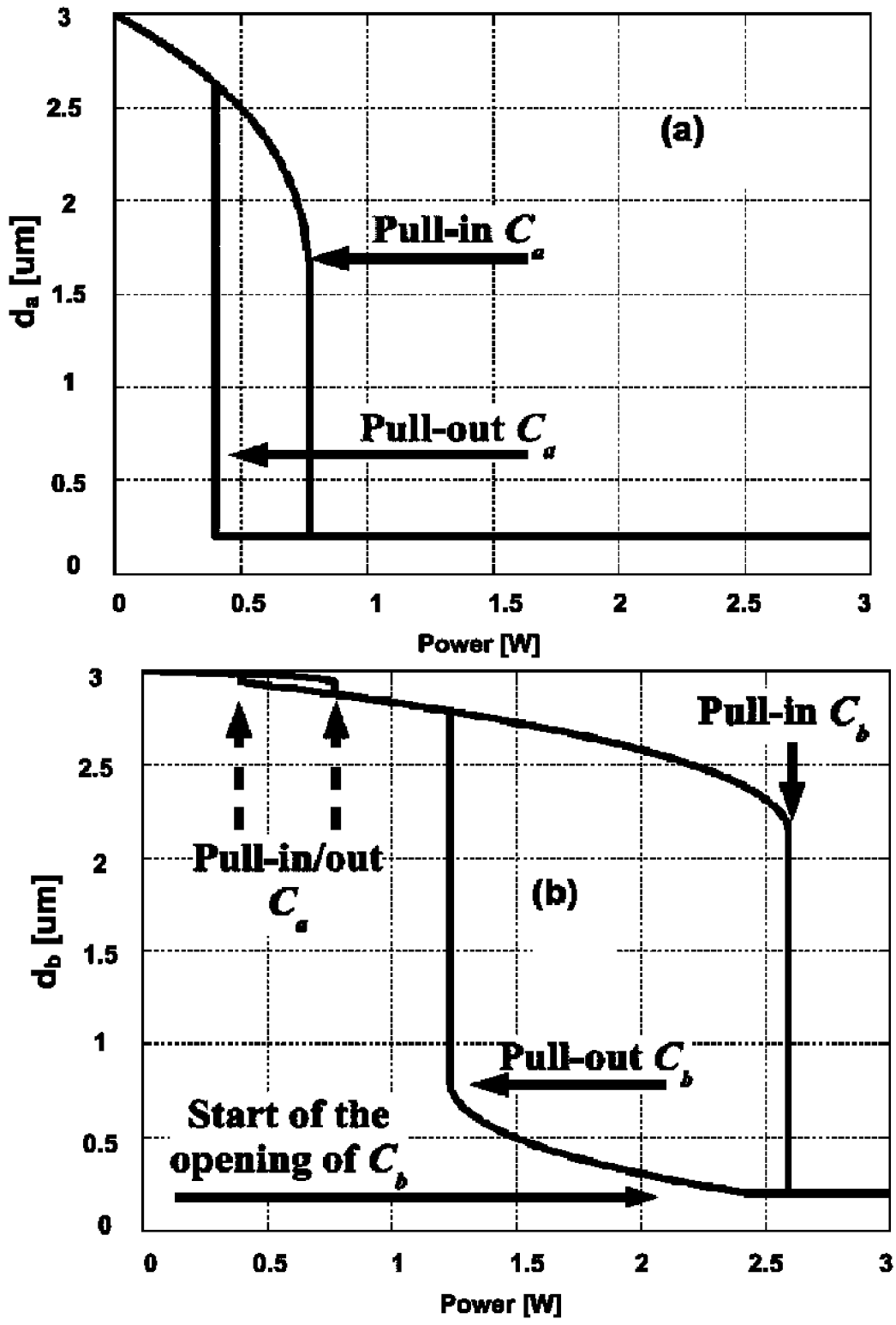
FIG. 16 plots the stable evolutions of the air gaps in the two LC-tank-based capacitive switching building blocks.

One side-effect of the wide hysteresis in the RF self actuation of the MEMS capacitor $C_a$ in FIG. 14(a) is that its pull-out $P_{avs}$ (i.e. $P_{avs|PO}$) is close to 0 W. As a result, this SPDT configuration is prone to failure because of the parasitic RF power, DC voltage, and charging. This result is linked to the LC-tank model of the switches. To narrow the RF self actuation hysteresis of the capacitor $C_a$ and thus increase its $P_{avs|PO}$, its series inductor can be lowered to $L_a$=0.1 nH. In this case, the actuation of the SPDT in the architecture of FIG. 4 produces the characteristics shown in FIGS. 15 and 16. Only the $P_{avs|PO}$ of $C_a$ is noticeably modified. The SPDT still self-actuates at 2.6 W but pulls-out this time at ≈0.4 W.

In the above-described examples, the RF self actuation was driven by an RF signal at the working frequency of the RF system. Indeed, the transmit power can not be lowered below the opening $P_{avs}$ of $C_b$ without hampering the function of the SPDT. In the purely capacitive case (the first and second LC-tank examples) the transmit power cannot drop below respectively 1.7 W, 2.4 W and 2.4 W. To keep the switch closed, a mild DC bias can be applied after a brief high RF power pulse is applied, as shown in FIG. 5. However, certain applications may not function desirably with the application of such a high RF power pulse without the redefinition of the communication protocol. Therefore, the disclosed approach does not require the RF self actuation frequency to be within the frequency spectrum treated by the T/R module. For narrow-band antenna applications, the RF self actuation frequency can be chosen such that the antenna would not radiate. Note that the disclosed systems and methods can be generalized to use a set of frequencies, an ultra-wideband pulse, and/or a frequency ramp.

An additional rational for replacing a DC voltage actuation source by an RF power source like the PA used in the present disclosure is that such an RF signal can be seen as an extreme bipolar actuation signal. Bipolar signals may partially mitigate charging and enhance the lifespan of electrostatic MEMS devices.

The invention claimed is:

1. A system comprising:
   at least one electrostatically actuatable micro electromechanical device comprising a first conductor and a second conductor having a moveable portion configured to be attracted by the first conductor at a predetermined actuation power; and
   an actuation device configured to generate the predetermined actuation power for the micro electromechanical device, wherein the actuation device comprises a high frequency signal generator configured to generate at least part of the actuation power by means of a predetermined high frequency signal with a frequency higher than the mechanical resonance frequency of the moveable portion.

2. The system of claim 1, wherein the actuation device further comprises a DC voltage generator configured to generate part of the actuation power by means of a predetermined DC voltage.

3. The system of claim 1, wherein one of the first or second conductors is configured as an RF signal line arranged for transmitting the HF signal, and wherein the other of the first or second conductors is electrically coupled to ground.

4. The system of claim 1 further comprising a power amplifier configured to amplify the high frequency signal to the predetermined actuation power.

5. The system of claim 1, wherein the at least one micro electromechanical device is a switch.

6. The system of claim 5, wherein the switch is implemented as a capacitive switch.

7. The system of claim 5, wherein the switch is implemented as an LC tank.

8. A system comprising:
   a micro electromechanical system comprising at least one electrostatically actuatable micro electromechanical device comprising a first conductor and a second conductor having a moveable portion configured to be attracted by the first conductor at a predetermined actuation power;
   an antenna configured to receive and transmit RF signals, wherein the antenna is connected via the micro electromechanical system to a receiver block and to a transmission block; and
   an actuation device configured to generate at least part of the predetermined actuation power for the micro electromechanical device, wherein the actuation device comprises a high frequency signal generator configured to generate at least part of the actuation power by means of a predetermined high frequency signal with a frequency higher than the mechanical resonance frequency of the moveable portion.

9. A method for controlling a micro electromechanical system comprising at least one electrostatically actuatable micro electromechanical device comprising a first conductor and a second conductor having a moveable portion which is configured to be attracted by the first conductor at a predetermined actuation power, and an actuation device for generating the predetermined actuation power for the micro electromechanical device, wherein the actuation device comprises a high frequency signal generator, and wherein the method comprises:
   generating at least part of the actuation power by means of the high frequency signal generator configured to generate a predetermined high frequency signal with a frequency higher than the mechanical resonance frequency of the moveable portion.

10. The method of claim 9 further comprising generating part of the actuation power with a DC voltage generator.

11. The method of claim 10 wherein the high frequency signal is guided in a carrying means.

12. The method of claim 9 wherein the micro electromechanical device is a switch.

13. A method for controlling a RF micro electromechanical system, the RF micro electromechanical system comprising an antenna for receiving and transmitting RF signals, the antenna being connected via a micro electromechanical system comprising at least one electrostatically actuatable micro electromechanical device comprising a first conductor and a second conductor having a moveable portion which in use may be attracted by the first conductor as a result of a predetermined actuation power, and an actuation device for generating the predetermined actuation power for the micro electromechanical device, to a receiver block and to a transmission block, the method comprising:

generating a RF signal;

amplifying the RF signal to the predetermined actuation power; and actuating the micro electromechanical system to route the RF signal to the antenna for transmission.

* * * * *